April 19, 1960
R. W. WATERFILL
2,933,100
AIR CONDITIONING APPARATUS
Filed Dec. 29, 1953
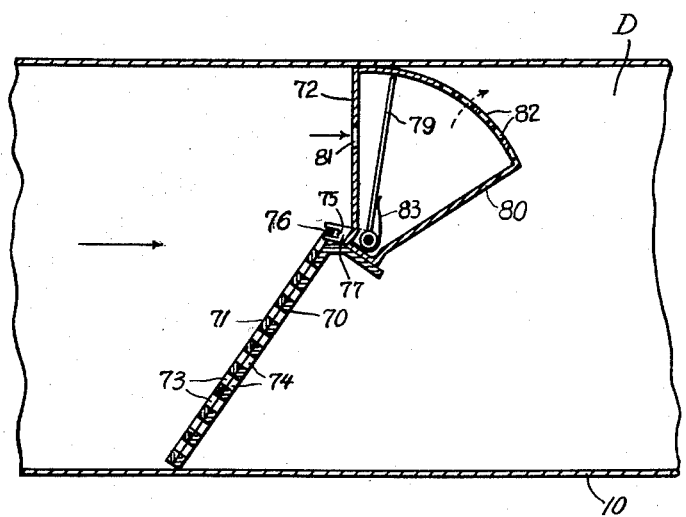
INVENTOR.
ROBERT W. WATERFILL
BY

United States Patent Office 2,933,100
Patented Apr. 19, 1960

2,933,100

AIR CONDITIONING APPARATUS

Robert W. Waterfill, Montclair, N.J., assignor to Buensod-Stacey, Incorporated, New York, N.Y., a corporation of Delaware Application December 29, 1953, Serial No. 400,962

2 Claims. (Cl. 137—499)

This invention relates to improvements in flow control devices, and is directed particularly to devices adapted for use in air distributing ducts for air conditioning systems.

In the operation of known air conditioning systems, particularly high pressure air systems, an objectionable feature has been a disturbing noise that is associated with the discharge of conditioned air in the zone or room. It is known that a factor involved is changed in the rate of air delivery, which occurs quite frequently because of variations in the pressure conditions in the delivery ducts and demand for air. One of the difficulties in controlling the rate of air flow in such a duct has been to provide a flow control device that is sensitive enough to reset the flow control valve or flow restriction in response to small pressure changes.

One of the objects of this invention is to provide a new and improved flow control device by which a substantially constant rate of flow may be automatically maintained at all times in a flow line subject to frequently varying pressures.

A further object of the invention is to provide such a flow control device which possesses a greater degree of sensitivity than known devices, without requiring auxiliary control apparatus.

The apparatus of this invention, in general, comprises a fluid supply duct having a restriction near its discharge formed with an open area positioned to be traversed by all the fluid being discharged. The restriction includes a control member movable in the duct to positions increasing and reducing the size of the opening, the member being regulated by a pressure responsive member which controls a fluid pressure motor utilizing fluid pressure from the supply duct for developing power to position the control member. The effective fluid pressure in the motor may be regulated so as to be proportional to predetermined pressure conditions that vary in accordance with the flow rate through the duct.

In one aspect of the invention, the control motor is employed to move two apertured plates relative to each other so as to change the free area through which air can flow.

These and other objects, features and advantages of the invention will become apparent from the following description of the accompanying drawing which is merely exemplary.

The drawing shows an embodiment of the invention in section.

The flow control for duct 10 includes two adjoining apertured plate members 70 and 71 which extend partially across a transverse section of the duct, the remainder of the section being closed by a solid piece 72 which forms part of the control motor housing 80. Plate 71 is movable laterally over the surface of plate 70 from a position in which its apertures 73 are aligned with apertures 74 in plate 70 to positions in which plate 71 partially or completely closes apertures 74. Plate 71 is formed with laterally projecting trunnions 76, only one of which can be seen in the drawing, at its upper end which are slidably received in recesses 75 of a lever 77 forming one arm of a bell crank lever. The other arm of the bell crank lever is a flat elongated member 79 that forms a pressure operated vane within the control motor housing 80. The forward wall 72 of housing 80 lies transverse to the path of flow in the duct and is formed with an opening 81 for admitting pressure fluid into the housing for action against one side of vane 79. The chamber formed by the housing and the other side of the vane is open to chamber D on the downstream side of the flow controller by a series of bleed openings or vents 82. Vane 79 is normally held by a spring 93 in a position setting the apertures 73 of plate 71 in alignment with apertures 74 in plate 70, but yields in response to increases in the pressure head, resulting from increased flow, to rotate the bell crank lever and move plate 71 relative to plate 70 in accordance with the pressure differential existing on opposite sides of the vane. Restricted openings 82 limit the escape of air pressure into chamber D so that apertures 82 will be closed only to the extent necessary to maintain the rate of flow through the duct constant.

It should be apparent that various details of construction can be changed without departing from the spirit of the invention as defined in the appended claims.

What is claimed is:

1. In an air conditioning system an air supply duct, air flow control means comprising a pair of plate members extending transversely across a portion of the duct and having adjacent faces in abutting relation, each of said plates having a plurality of apertures therein arranged so as normally to be aligned to define a restricted passageway for the flow of air therethrough, at least one of said members being movable laterally relative to the other to vary the alignment of the apertures and thereby the size of the passageway, a baffle member positioned to close the spacing between the plate members and opposing wall portions of the duct, a control device comprising air pressure operated means including a housing and a movable member therein connected with the movable plate for controlling the position of such plate relative to the other plate, said baffle member forming a wall portion of said housing and having an opening therein to admit air pressure from the supply duct into said housing for operating said movable member, and resilient means normally holding the movable member in a position in which the passageway is fully open but yielding as the supply pressure increases so that the movable member will be displaced by the air supply pressure for varying the size of the pasageway as the supply pressure changes.

2. In an air conditioning system an air supply duct, air flow control means comprising a pair of plate members extending transversely across a portion of the duct and having adjacent faces in abutting relation, each of said plates having a plurality of apertures therein arranged so as normally to be aligned to define a restricted passageway for the flow of air therethrough, at least one of said members being movable laterally relative to the other to vary the alignment of the apertures and thereby the size of the passageway, a baffle member positioned to close the spacing between the plate members and opposing wall portions of the duct, a control device comprising air pressure operated means including a housing and a movable member therein connected with the movable plate for controlling the position of such plate relative to the other plate, said baffle member forming a wall portion of said housing and having an opening therein to admit air pressure from the supply duct into said housing for operating said movable member, resilient means normally holding the movable member in a position in which the passageway is fully open but yielding as the supply pressure increases so that the movable member will be displaced by the air supply pressure for varying the size of the passageway as the supply pressure changes, and vent means in said housing on the downstream side of said plate, said vent means being positioned to be increasingly uncovered by said movable member.

References Cited in the file of this patent

UNITED STATES PATENTS

| | | |
|---|---|---|
| 116,321 | Keller | June 27, 1871 |
| 490,146 | James | Jan. 17, 1893 |
| 597,141 | Craig | Jan. 11, 1898 |
| 793,536 | McCormick | June 27, 1905 |
| 860,914 | Haley | July 23, 1907 |
| 1,699,676 | Rush | Jan. 22, 1929 |
| 2,077,384 | Dettenborn | Apr. 20, 1937 |
| 2,189,475 | Saur | Feb. 6, 1940 |
| 2,517,820 | Aagaarg | Aug. 8, 1950 |
| 2,601,231 | Smith | June 24, 1952 |

FOREIGN PATENTS

| | | |
|---|---|---|
| 17,896 | Great Britain | of 1911 |